Sept. 24, 1935.  A. J. WEATHERHEAD, JR  2,015,541
HOSE COUPLING
Filed Jan. 3, 1933

Inventor
ALBERT J. WEATHERHEAD, JR
BY
Richey & Watts
Attorneys

Patented Sept. 24, 1935

2,015,541

UNITED STATES PATENT OFFICE 2,015,541

HOSE COUPLING

Albert J. Weatherhead, Jr., Cleveland, Ohio, assignor to The Weatherhead Company, Cleveland, Ohio, a corporation of Ohio Application January 3, 1933, Serial No. 649,833

1 Claim. (Cl. 285—86)

This invention relates to hose couplings, and particularly to couplings of a type adapted to be used in conjunction with rubber or other non-metallic gasoline hoses of motor cars.

The engines of modern automobiles are almost universally mounted on resilient supports which allow a certain amount of relative movement between the engine and the frame, and accordingly it is necessary to make the connection between the gasoline line carried by the frame and the fuel pump or carburetor, by means of a flexible hose of rubber or other suitable material. The couplings at the ends of the hose must, of course, be leak-proof, and because of the fact that the hose is subjected to vibration, the connection must be permanently secure, and the hose should not be weakened or subjected to any cutting or chafing action by the coupling.

Because of the severe operating conditions and because of the fact that hoses are frequently damaged by mechanics while servicing or repairing engines, a large demand has arisen for replacement hoses and couplings. Obviously such couplings should be capable of easy installation, and should be constructed so that any ordinary mechanic will be able to install a new hose merely by cutting the hose to the proper length for the particular car and securing the couplings to the ends of the hose by means of simple hand tools.

Accordingly, a general object of my invention is to provide a hose coupling embodying the advantageous features outlined above. Another object of my invention is to provide a coupling embodying these advantages and which can be easily and economically manufactured. A further object is the provision of a coupling which can be permanently connected to a hose by means of ordinary wrenches. Another object is to provide a coupling which can be permanently connected to a hose after the coupling is installed, thus removing the necessity for the use of swivel joints.

Other objects and advantages of my invention will become apparent from the following description of preferred forms thereof, reference being made to the accompanying drawing. The essential characteristics are summarized in the claim.

Figure 1:
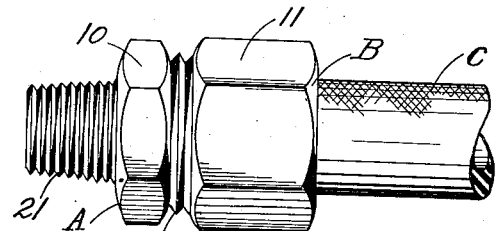
Figure 2:
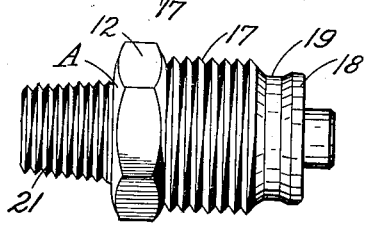
Figure 3:
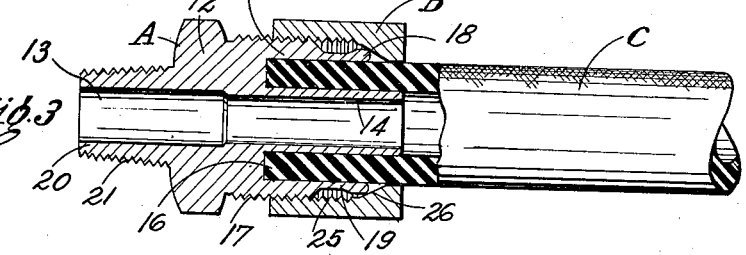
Figure 4:
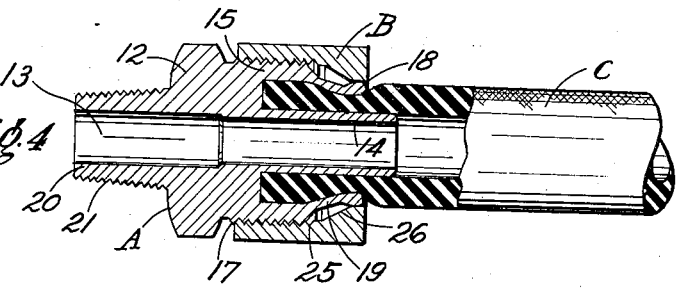
Figure 6:
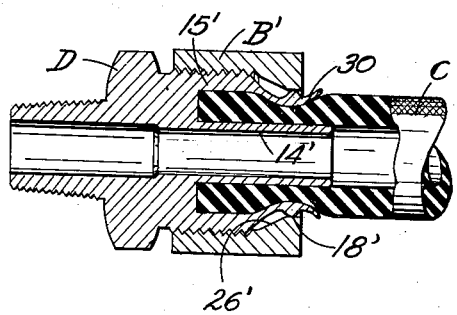
Figure 5:
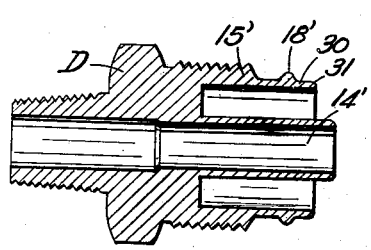

In the drawing, which illustrates preferred forms of my invention, Fig. 1 shows one form of my coupling secured to the end of a rubber hose; Fig. 2 illustrates the coupling member with the clamping nut removed and before it has been secured to the hose; Fig. 3 is a section showing the coupling member, clamping nut and hose in assembled relationship but before the clamping action has taken place; Fig. 4 is a sectional view through the assembly shown in Fig. 1; Fig. 5 shows a modified form of coupling member; and Fig. 6 is a section similar to Fig. 4 but in which the coupling of Fig. 5 is employed.

As shown in the drawing, the complete assembly preferably comprises a coupling member A and a clamping nut B, both of which have hexagonal external surfaces as at 10 and 11, and both of which may be formed from bar stock by automatic screw machine operations. The coupling member A preferably comprises a body portion 12 having a longitudinal bore 13 and a nipple 14 which is adapted to project within the flexible, non-metallic hose C which may be made of any ordinary materials such as rubber or rubber and fabric, with or without a metallic lining. A sleeve 15 projects from the body portion in the same direction as the nipple and has an internal diameter substantially the same as the external diameter of the hose C. The nipple and sleeve thus provide an annular chamber adapted to receive the hose, and having an end wall 16 adapted to contact with the end of the hose.

The sleeve is externally threaded as at 17 and at its end is provided with a rounded bead 18. Between the threaded portion and the bead the metal is cut away to provide a weakened portion as at 19 so that the bead may be deformed inwardly to compress the hose and hold it firmly in position. In order to secure the coupling member to the fuel pump or carburetor, any convenient means such as the projection 20 having pipe threads 21 may be employed.

The clamping nut C is internally threaded as at 25 to engage the external threads 17 of the sleeve and is provided with a conical cam surface 26 which is adapted to engage the bead 18 and force it inwardly into tight engagement with the hose.

As shown in Figs. 3 and 4, the coupling may be assembled by inserting the hose into the annular space between the nipple 14 and the sleeve and thereafter screwing the clamping nut onto the thread 17 until the cam surface 26 has forced the bead into clamping engagement with the hose. It will be noted that the nipple extends slightly beyond the bead 18 so that the interior of the hose is supported against the clamping pressure and the internal passageway of the hose is not restricted. Because of the rounded bead on the end of the sleeve, there is no danger of cutting the hose by the clamping operation, or by the vibrating movements of the hose in service.

The sleeve 15 is preferably solid so that the bead will have no tendency to spring away from engagement with the hose after the clamping operation has taken place. Thus the hose will be firmly held even though the clamping nut should be removed. Because of this construction, the clamping nut can be used merely as a tool for securing the coupling member and the hose together and may be removed from the assembly after the clamping operation has taken place. If desired, the clamping nut may be made in two pieces hinged together so that the nut can be removed from the assembly by separating the two parts of the nut and without unscrewing the nut and slipping it along the hose.

It will be noted that the clamping operation requires no rotation of the hose or of the coupling member, thus the installation of a hose can be made by first making the desired connection between the coupling member and the carburetor or fuel pump, thereafter inserting the hose in the annular space between the nipple and sleeve and then securing the hose to the coupling member by means of the clamping nut. By reason of this construction, replacement installations can be conveniently and rapidly made without danger of twisting the rubber hose.

In Figs. 5 and 6, I have illustrated a coupling member in which the clamping action of the nut forms a bell mouth on the sleeve to further protect the hose against wear. The coupling member D is similar to the coupling member A, described above, except that the sleeve 15' is provided with a thin tubular extension 30 which projects beyond the bead 18'. When the clamping action takes place, the cam surface 26' of the clamping nut B' engages the bead 18' to force it inwardly to compress the hose against the nipple 14' in the manner described with reference to the coupling member A. However, the thin tubular extension 30, because of the pressure of the hose and the natural behavior of the metal, will be flared outwardly as shown in Fig. 6, thus providing a bell mouth coupling. The edge of the tubular projection 30 may be rounded or chamfered as at 31 in order to make it easier to insert the hose into the space between the nipple and the sleeve and also to prevent any possibility of the edge cutting the hose.

From the foregoing description of preferred forms of my invention, it will be seen that I have provided hose couplings which are adapted to make a permanent and leakproof connection with a non-metallic hose. Because of the fact that the sleeves are continuous and not split, there is no danger of the hose coming loose even tho the clamping nut should be removed or loosened by vibration. Furthermore, the formations of the ends of the sleeves provide a tight joint and at the same time prevent any cutting or chafing action of the coupling on the hose. My couplings make tight joints without restricting the passageway of the hose and by means of my couplings, hoses can be easily and rapidly installed or replaced without special tools and without danger of twisting the hoses.

In this specification, I have described preferred forms of my invention with reference to one particular use thereof. It is obvious that my invention can be changed and modified and applied to different uses without departing from the spirit or scope thereof. Accordingly, it is to be understood that my patent is not limited by the foregoing description or in any manner other than by the appended claim when given the range of equivalents to which it may be entitled.

I claim:—

In a device of the character described, a coupling member having a body portion, a cylindrical nipple projecting from the body portion and adapted to extend within a non-metallic hose, the external diameter of the nipple being substantially uniform throughout its entire length and being substantially equal to the internal diameter of the hose, said body portion having a flat radial wall adjacent the base of the nipple adapted to engage the end of the hose, an integral sleeve projecting from the body portion and concentric with the nipple and adapted to surround the outer surface of the hose, said sleeve having a continuous substantially cylindrical inner surface of substantially uniform diameter throughout its length and substantially equal to the external diameter of the hose, an externally threaded portion adjacent the body portion of the coupling, and a deformable portion extending beyond the threaded portion, in combination with a clamping nut having threads adapted to engage the externally threaded portion of the sleeve and an internal cam surface adapted to engage the sleeve to deform said portion inwardly to compress the hose between the sleeve and the nipple and to urge the material of the hose toward said radial wall upon relative rotation between said nut and the coupling member.

ALBERT J. WEATHERHEAD, Jr.